United States Patent [19]

Skovgaard

[11] 3,818,491

[45] June 18, 1974

[54] APPARATUS FOR RECORDING THE SPEEDS OF A VEHICLE ON A TRAVELLING RECORD CARRIER

[76] Inventor: Helge Erling Skovgaard, 211 Asmundshoj, 3480 Fredensborg, Denmark

[22] Filed: Sept. 13, 1972

[21] Appl. No.: 288,694

[30] Foreign Application Priority Data

Sept. 21, 1971 Sweden.............................. 11922/71

[52] U.S. Cl. ............. 346/21, 250/483, 252/301.6 S, 346/108
[51] Int. Cl. ............................................. G01d 9/12
[58] Field of Search ................. 346/21, 109, 108, 1; 250/458, 459, 483, 484; 252/301.6 S

[56] References Cited
UNITED STATES PATENTS

| | | | |
|---|---|---|---|
| 2,210,565 | 8/1940 | Asher................................ | 128/2.06 |
| 2,973,408 | 2/1961 | Hirsch................................ | 178/89 |
| 3,013,854 | 12/1961 | Vogtun et al..................... | 346/21 X |
| 3,144,295 | 8/1964 | Le Massena....................... | 346/109 |
| 3,179,949 | 4/1965 | Harrison et al.................... | 346/109 |
| 3,444,372 | 5/1969 | De Hart............................. | 250/483 |

OTHER PUBLICATIONS

The ABC of Luminescence; The New Jersey Zinc Company, 1944, pp. 1–24 (Exc. 23–23), copy in Scientific Library, QC 477 N5.

*Primary Examiner*—Joseph W. Hartary
*Attorney, Agent, or Firm*—Holland, Armstrong, Wilkie & Previto

[57] ABSTRACT

A means for continuously recording the instantaneous speed of a vehicle during travelling periods thereof. The recording is effected by means of a light beam which impinges upon a layer of phosphorescent material provided on or in an endless tape advanced either at a constant speed or at a speed proportional to the vehicle speed. The means for creating or transmitting the light beam is connected to the tachometer drive of the vehicle in such a way that the light beam intersects the tape in a point, the location of which transversely of the tape depends upon the vehicle speed. A continuous or quasi-continuous speed curve is thus recorded in the layer of phosphorescent material, and this curve may later be photographed as long as the material is still emitting sufficient light from the excited particles thereof. Due to the decreasing intensity of the luminescent particles, the curve will automatically be deleted after a certain time dependent upon the properties of the phosphorescent material employed. Means may be provided for effecting a positive deletion or erasion of the curve during the passage of the tape past such means and before any subsequent recording is effected on the tape.

3 Claims, 9 Drawing Figures

PATENTED JUN 18 1974 3,818,491

APPARATUS FOR RECORDING THE SPEEDS OF A VEHICLE ON A TRAVELLING RECORD CARRIER

BACKGROUND OF THE INVENTION

The present invention relates to a method of recording the instantaneous speed of a vehicle on a travelling record carrier with the aid of means which, on the carrier, produce a punctiform recording the location of which, as measured in a direction transverse to the direction of travel of the carrier, is dependent upon the instantaneous speed of the vehicle.

Such recording of the speed of an automobile or motor cycle during a drive extending over some time and distance is of particular interest in connection with the surveillance of speed limits on specific road sections or for establishing and evaluating the causes of a traffic accident, and in such a case it is necessary that the various speeds at which the vehicle was travelling can be recorded in the form of a curve that can still be read out even if some time has elapsed before the person who has exceeded the speed limit is stopped or apprehended or before the accident is discovered. On the other hand, it is desirable that the recorded curve should be automatically erased or deleted after a certain period of time has elapsed so that the same record carrier can be utilized for a long time, preferably during the entire service life of the vehicle.

It is known to record the speeds of a vehicle by means of a stylus which produces a curve in a thin layer of dye on a rotating disc, and from German Pat. No. 1 098 748 it is known to effect an automatic erasure or deletion of the curve with the aid of means comprising a chamber mounted stationarily above the disc in front of the stylus, which chamber contains a supply of dye and in which a rotating roller agitates and mixes the dye layer on the disc with the quantity of dye present in the chamber so that the disc, when passing out of the chamber, is covered by a uniformly thick layer of dye. This prior art method is, inter alia, subject to the disadvantage that the dye dries up in the course of time and has to be replaced.

It is also known from accepted German specification DAS No. 1 036 543 to record a speed curve in the form of magnetic pulse records on a carrier of magnetizable material and to effect an automatic erasure or deletion of the recordings by means of a stationary erasing or deleting head. This method is subject to the disadvantage that the reading of the curve calls for a complicated apparatus which is capable of converting the magnetic records into a curve which directly indicates the speed of the vehicle and which can be used as evidence before a court.

Danish Pat. No. 95 446 discloses an apparatus which, by purely mechanical means, carries out a discontinuous recording of the speed of the vehicle by means of a plurality of pins or tongues that are displaceable in radial slots provided in a rotating disc. When the disc rotates, each tongue is moved into a neutral zero position and is subsequently moved — in response to a pulse derived from the tachometer drive of the vehicle — out to a radius dependent upon the instantaneous speed so that the tongues collectively form a curve depicting the various speeds at which the vehicle was travelling. The apparatus is complicated and expensive since it has to be provided with a large number of movable tongues if widely varying vehicle speeds are to be registered with an acceptable degree of accuracy, and its power consumption is relatively large due to friction etc.

SUMMARY OF THE INVENTION

According to the present invention there is provided a method of continuously recording the speed of a vehicle by producing a sequence of punctiform recordings on a travelling record carrier, the location of each such recording in a direction transverse to the direction of travel of said carrier being dependent upon the vehicle speed at the moment when said recording is made, characterized by the improvement that said recordings are produced by means of a light beam and upon an endless record carrier provided with a uniformly distributed layer of a phosphorescent material having an afterglow period of at least two hours.

The method according to the invention possesses the significant advantage over the prior art methods that it can be carried out with an apparatus whose useful service life is practically unlimited and, at all events, is just as long as the service life of an automobile or a motor cycle and which does not require any maintenance or inspection during all this time. Today, phosphorescent materials are available on the market that retain their light-omitting properties for 15 to 20 years, at least when they are protected against the influence of atmospheric humidity. Electric light sources having a service life of up to 100,000 hours are likewise commercially available. By selection of a phosphorescent material the afterglow period of which is appropriately related to the travel of the vehicle which corresponds to the length of the record carrier, the speed curve recorded will have disappeared at a specific point of the carrier or, at any rate, weakened to such an extent when the next recording is made at that point, that it will be easy to distinguish between the two recordings on a photographic reproduction of the carrier. With an afterglow period of at least 2 hours, it will be possible to obtain with certainty a sufficiently clear photographic reproduction of the speed curve for use as documentation material, even if a violation of a speed limit or a traffic accident is not noted or discovered immediately after having taken place.

It is preferred that the afterglow period of the phosphorescent material be in excess of 12 hours. Even in the case of highly unfavourable circumstances in connection with a traffic accident, particularly in the case of a so-called "single" accident occurring at night-time, it will normally always be possible to obtain a sufficiently clear photographic reproduction of the speed curve after the accident has been discovered.

Materials containing zinc sulphide or zinc cadmium sulphide have been found to be particularly suitable for recording the speed curve. As an example of such a material may be mentioned the material supplied by Messrs. Riedel-de Häen AG, Seelze-Hanover, Germany, bearing the designation 50 003 (corresponding to PL14–580 green according to DIN (German Industrial Standard) 67510) having an afterglow period of approximately 25 hours and a greenish phosphorescence. It is emphasized that the phosphorescence of the material in question is based upon a content of impurities the nature of which, however, is supposed to be a trade secret.

The invention also provides a record carrier for carrying out the method as defined above, which record carrier comprises an endless supporting tape and a layer of a phosphorescent material having an afterglow period of at least 2 hours, said layer being uniformly distributed over the area of said supporting tape and supported thereby. As already mentioned above the afterglow period may advantageously exceed 12 hours, and phosphorescent materials containing zinc sulphide or zinc cadmium sulphide are preferred. It is, however, also possible to employ phosphorescent materials containing alkaline earth metal sulphides, in particular when a rather prolonged afterglow period is desired.

The tape may be translucent, which has the additional advantage that it is possible to record the speed curve from the inside of the tape and to photograph it from its outside. It is possible thereby to utilize a part of the space between the two runs of the endless tape for mounting light-transmitting means, which reduces the space required by the apparatus employed for the recording operation.

The phosphorescent material of the tape may be hermetically enclosed between outer layers of transparent or at least translucent material, preferably a plastics material. Hereby maximum protection is afforded to the phosphorescent material against external influences, such as varying atmospheric humidity which could adversely affect its service life.

Finally, the invention provides an apparatus for carrying out the recording method which apparatus comprises a light-proof housing, two rollers journalled for rotation on parallel axes within said housing and means for driving one of said rollers, an endless tape tracked over said rollers and in driving engagement with said driven roller, said tape having a uniformly distributed layer of a phosphorescent material, the afterglow period of which is at least 2 hours, a light source and means for transmitting a light beam from said light source towards said tape, means connectable to the tachometer drive of a vehicle and connected to said light transmitting means in such a way that the point of intersection between said light beam and said tape — as measured in the transverse direction of said tape — is uniquely dependent upon the instantaneous speed of said vehicle, means within said housing for accommodating a photographic plate in engagement with at least a portion of said endless tape extending between said rollers, and a light trap for introducing said photographic plate into said housing and removing it therefrom.

The apparatus may contain means for automatically erasing or deleting a previous recording on the tape before the light beam next time falls on the tape. It is then possible to employ phosphorescent materials that have a very long afterglow period and thus a long durability of the speed curve recorded, even when the tape length corresponds to a travelling period which — assuming continuous driving at maximum speed — is considerably shorter than the afterglow period. Despite the compact dimensions of the apparatus made possible by the relatively short tape, it is still possible to photograph the curve a long time after the traffic accident has taken place, since the travel of the tape through the apparatus ceases once the vehicle stops.

When the light source is mounted adjacent the tape and the deletion or erasure means comprise a filter mounted between the tape and the light source, which filter is adapted to filter off radiation at frequencies capable of producing a phosphorescence of the phosphorescent material, a complete illumination of the entire width of the tape through the filter by means of the same light source which is used to record the speed curve, is achieved in a simple manner and with a compact construction of the apparatus.

BRIEF DESCRIPTION OF THE DRAWINGS

The invention will now be described in greater detail with reference to the accompanying diagrammatical drawings, in which.

DETAILED DESCRIPTION

Figure 1:
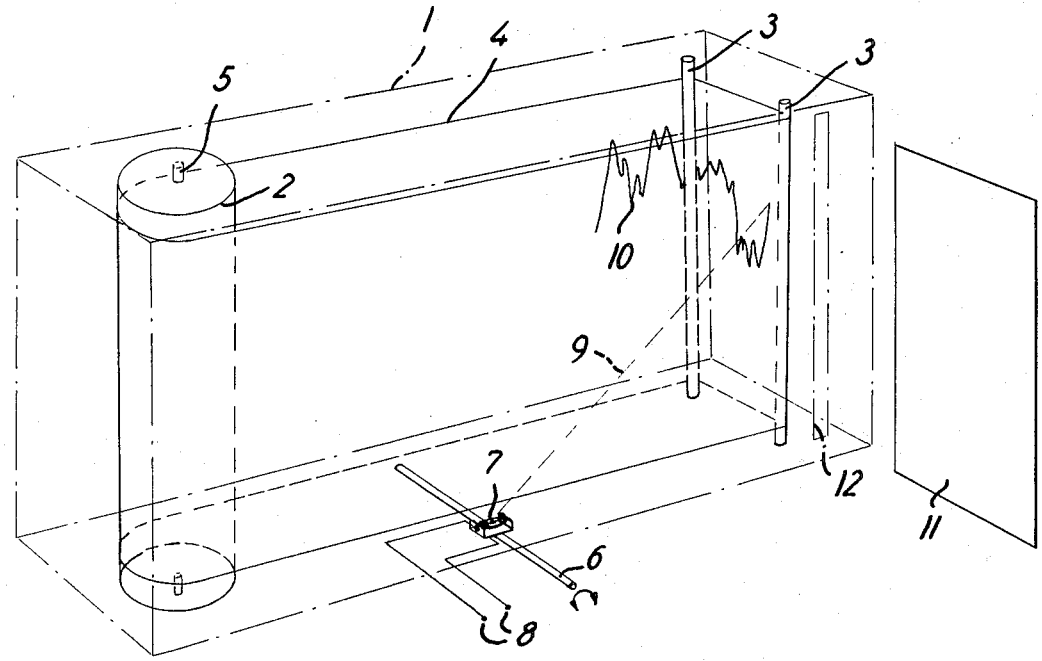
FIG. 1 is a perspective view illustrating the principal construction of an apparatus according to the invention for recording a speed curve and for subsequently photographing the curve.

The apparatus shown purely schematically in FIG. 1 comprises a light-proof cassette 1 and a roller 2 rotatably journalled at one end of the cassette. At the opposite end of the cassette, two smaller guide rollers 3 are rotatably journalled parallel to roller 1. An endless, tape-like record carrier 4 extends over rollers 2 and 3, and the tape may be fabricated from transparent plastics material, e.g. PVC, nylon or a polyester. The record carrier 4 contains a uniformly distributed layer of one or more phosphorescent materials which may be embedded in the tape or applied as a coating onto one of its sides. In the latter case, the phosphorescent material may be protected against wear and tear and other undesirable influences by means of a covering layer of translucent plastics material or lacquer. Tape 4 is kept stretched over rollers 2 and 3, preferably by spring-loading means acting upon one or more of the rollers and it is driven bey means of roller 2 shich may be provided with a friction coating or with teeth that engage with a perforation along at least one edge of tape 4.

Shaft 5 of roller 2 extends in a light-proof manner through cassette 1 and is adapted to be coupled to a driving source, preferably the tachometer drive (not shown) of the vehicle in such a way that the angular velocity of the shaft and, hence, the advancing speed of tape 4 through the cassette, is proportional to the the instantaneous speed of the vehicle. It will be appreciated that a speed-reducing gear will normally be incorporated in the driving mechanism in order to achieve an appropriately low speed of tape 4. Alternatively, it would also be possible to drive shaft 5 at a constant speed during those periods in which the vehicle is moving, whereby a speed curve is recorded on tape 4 in which the abscissa is proportional to the driving time instead of the distance travelled by the vehicle. In FIG. 1, the direction of rotation of roller is marked with an arrow.

A shaft 6 is journalled in cassette 1 so as to extend parallel to that portion of tape 4 which extends between the idling rollers 3, and it is connected to the tachometer drive of the vehicle in such a way that the angular position of shaft 6 is uniquely determined by the instantaneous speed of the vehicle. To the shaft 6 there is secured a light source 7, e.g. an electric miniature light bulb which, via supply lines 8, is supplied from a suitable current source, for example, the battery of the vehicle and preferably via the ignition switch of the vehicle so that bulb 7 is lit essentially only when the vehicle is running. Light source 7 emits, if necessary through a narrow aperture or other suitable optical means, a relatively sharply defined light beam 9 which is directed towards the portion of tape 4 located between the two rollers 3 and is perpendicular to the shaft. Due to the presence of the phosphorescent material in or on the tape, the light beam produces a luminescent spot or point where it impinges upon tape 4 and as a consequence of the advancing of the tape mentioned above, the successive luminescent spots or points form a practically speaking continuous curve 10 which depicts the various speeds at which the vhicle is travelling.

Curve 10 can be photographed by means of a photographic plate 11 which can be inserted into the cassette via a light trap 12 and be brought into engagement with the plane portion of the tape between rollers 3. In the embodiment shown in FIG. 1, in which only a portion of the curve is located between rollers 3, the cassette should be quipped with means for manually rotating roller 2 so that it becomes possible to take several photographs each of which covers a portion of the complete curve.

Since the intensity of the luminescent spots which together form curve 10 diminishes with the passing of time, this curve will gradually and spontaneously disappear and by an appropriate selection of the afterglow period of the phosphorescent material as well as the length of tape 4, it is possible to achieve that, to all intents and purposes, any point of curve 10 has been erased or deleted before a recording is next time effected at the same location (abscissa) of the tape even when the vehicle is driven continuously through a distance corresponding to the length of the tape.

Figure 2:
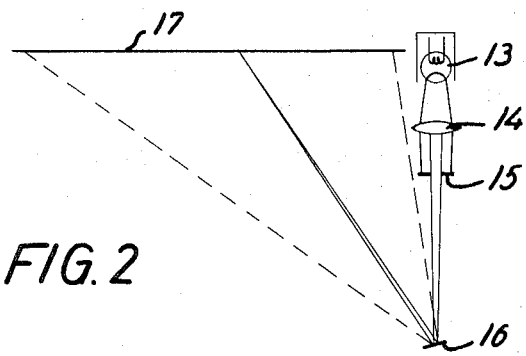
FIG. 2 shows a view of the light beam path in a modified embodiment of the apparatus.

FIG. 2 illustrates a modified embodiment of the optical means of the apparatus which in this case comprise an electric bulb 13 that can be supplied with power in the same way as bulb 7 mentioned above, a convex lens 14, a diaphragm 15 and a mirror 16. The light from bulb 13 is collected by means of lens 14 and is confined into a thin beam or pencil of rays by passing through the aperture of diaphragm 15, whereupon it is reflected by mirror 16 onto the record carrier 17. The mirror 16 is secured in a manner (not shown in detail) to a pivotal shaft corresponding to shaft 6 in FIG. 1, so that the angular position of the mirror is dependent upon the instantaneous speed of the vehicle.

Figure 3:
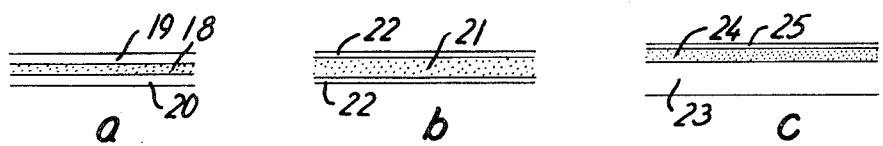
FIGS. 3a, 3b and 3c are diagrammatical sections through embodiments of the record carrier.

FIG. 3 shows three possible embodiments of the tape-shaped record carrier in section. In FIG. 3a, a layer 18 containing or consisting of one or more phosphorescent materials is disposed between two covering layers 19 and 20 that may be fabricated from translucent plastics material, e.g. transparent PVC sheet. The insides of the two covering layers may be provided with a bonding agent for holding layer 18 in place.

In FIG. 3b, a layer 21 of phosphorescent material, by way of example in powder-form, is melted or cast into a sheet of translucent plastics material and the phosphorescent material 21 fills the greater part of the thickness of the tape so that there are at most only a comparatively thin covering layer 22 of pure plastics material on each side of the phosphorescent powder layer.

In FIG. 3c, the tape consists of a carrying layer 23 of transparent or translucent plastics material, onto which a layer 24 of powdery, phosphorescent material has been applied and subsequently covered with a thin coating 25 of plastics material or lacquer.

Figure 4:
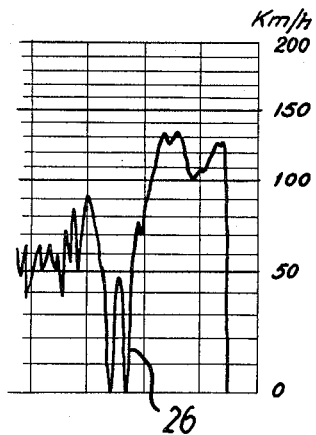
FIG. 4 shows an example of a curve recorded by means of the apparatus and superposed upon suitable scales for speeds and distances covered.

With the optical systems illustrated in FIGS. 1 and 2, the speed scale of the recorded curve normally becomes non-linear due to the varying angle between the light beam and the plane of the tape. However, the scale is defined by the construction of the apparatus and it is possible to employ a correspondingly designed line grid for reading the photographed curve as indicated in FIG. 4, which shows a speed curve 26 superposed upon such a line grid comprising horizontal lines with varying spacing for indicating the speed of the vehicle and vertical lines having a constant spacing corresponding to certain distance travelled by the vehicle if the tape is driven in timed relationship with the speed of the vehicle, or to a certain time interval if the tape is driven at a constant speed. It will be appreciated in this connection that if the speed curve is recorded with a light source secured directly to a pivoting arm, the angular position of which corresponds to the instantaneous speed of the vehicle (as in known tachographs), the lines which in FIG. 4 are shown straight and vertical, become circular arcs defined by the curve which the light source describes in response to the pivoting movement of the arm relative to the stationary tape.

Figure 6:
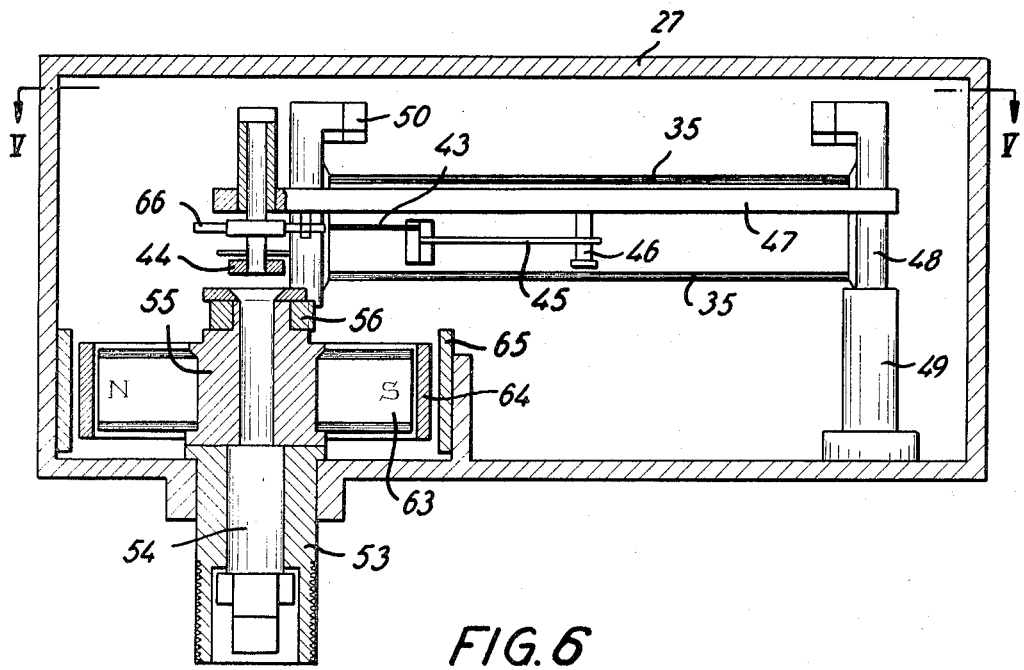
FIG. 6 is a section along line VI—VI in FIG. 5.
Figure 5:
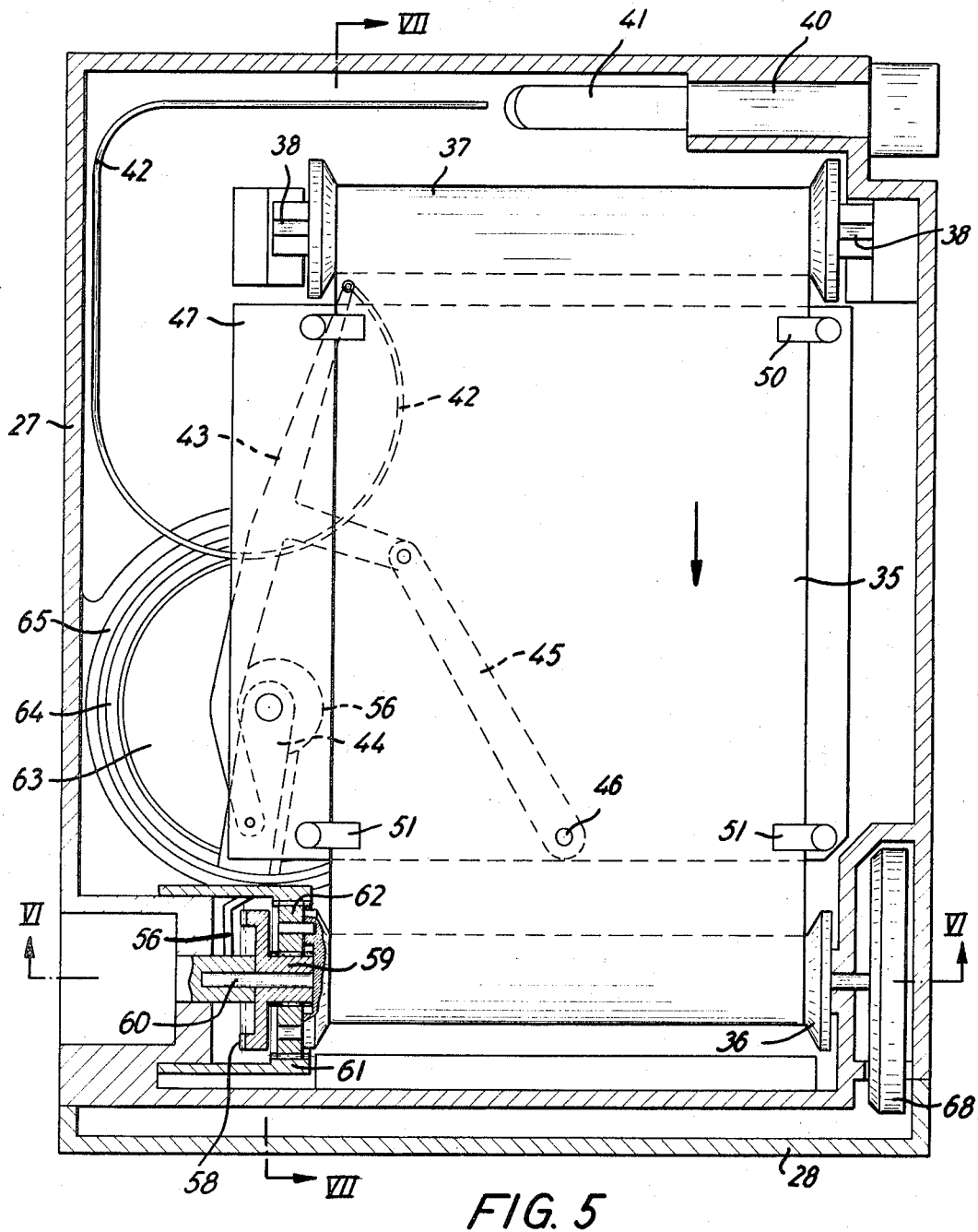
FIG. 5 is a section through a more detailed apparatus embodying the invention, the section being taken along line V—V in FIG. 6.
Figure 7:
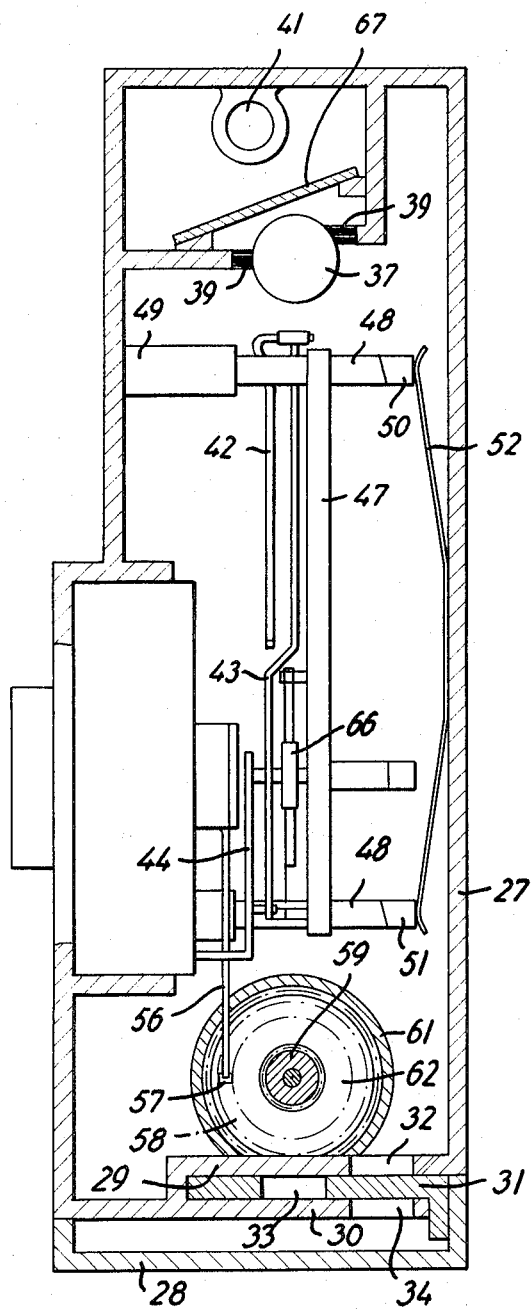
FIG. 7 is a section along line VII—VII in FIG. 5.

The apparatus illustrated in FIGS. 5–7 has a light-proof housing 27 which at one end is closed by a detachable cover 28. Normally, the cover will be sealed in such a way as to prevent unauthorized removal thereof. Adjacent cover 28, housing 27 is formed with two parallel walls 29 and 30, between which a slide 31 is displaceable. Apertures 32, 33 and 34 are provided in walls 29 and 30 and in slide 31, respectively, and the apertures are in mutual alignment to permit the introduction of a film cassette (not shown) into housing 27 when slide 31 is pulled out, that is to say towards the right from the position shown in FIG. 7, which is possible only after cover 28 has been removed.

In FIGS. 5–7, the record carrier is constituted of an endless tape 35 tracked over two parallel rollers 36 and 37 which are rotatably journalled at the opposite ends of housing 27. The shaft of roller 37 is journalled in two bearing blocks 38 which are displaceably supported in guides (not shown in detail) and spring loaded away from roller 36 so that an appropriate tension is maintained in tape 35. In connection with roller 37 there are mounted two flexible strips 39 of known construction which are in light-proof engagement against the outside of tape 35, see FIG. 7.

Outside roller 37, a socket 40 for an electric bulb 41 is secured in the housing wall and one end of a fibre-optical light conductor 42 is secured to the inside of the housing adjacent bulb 41. The other extremity of light conductor 42 is secured to an arm 43 and bent into an angle so that its end is perpendicular to and lies close against the inside of tape 35 which, for the sake of clearness, is not shown in FIG. 7. At its opposite end, arm 43 is hingedly connected to a crank arm 44 and between the two ends, arm 43 is hinged to one end of a link 45 which, at its opposite end, is pivotally connected to a fixed pin 46. Pin 46 is secured to a plate 47 which is located between the two rollers 36 and 37 and whose width slightly exceeds that of tape 35.

Plate 47 is displaceable in the direction perpendicular to tape 35, that is to say up and down in FIG. 6, in that, at its corners, it is secured to four standards 48 which are slidably guided in guides 49 projecting from the bottom of housing 27. Standards 48 project above plate 47 and are, at the top (as seen in FIG. 6), formed as hooks 50 and 51 that project inwards across tape 35. Two leaf springs 52, one of which is shown in FIG. 7, are fitted between the inner top wall of housing 27 and the two hooks 50 and 51 at either edge of the tape and normally serve to keep plate 47 slightly spaced below the inside of tape 35. When a photographic cassette is inserted into housing 27 through the aforesaid light trap comprising the apertures 32, 33 and 34, the outer or top face of the cassette engages the hooks 50, 51 and thereby lifts plate 47 and tape 35 up into close engagement with the film plate in the cassette for photographing the speed curve recorded on the tape.

The bottom wall of housing 27 (FIG. 6) is formed with a projecting hub 53 in which a stub shaft 54 is journalled which, at its downwardly-facing end, is constructed to drivingly engage with a shaft (not shown), preferably a flexible shaft, which is driven from the wheels of the vehicle (not shown), e.g. via the normal tachometer drive of the vehicle A sleeve 55 secured to shaft 54 inside the housing has an eccentric portion at its topmost end on which a ratchet arm 56 is pivotably mounted. At its free end, i.e. at the bottom of FIGS. 5 and 7, arm 56 is formed as a ratchet 57 which engages with ratchet teeth 58 on a wheel 59 which is rotatably journalled on the bearing pin 60 of roller 36. Coaxially with bearing pin 60, a sleeve 61 is secured to the housing and formed with internal teeth which engage with a plurality of planetary wheels 62 whose shafts are secured to roller 36. In addition, the planetary wheels engage with external teeth on wheel 59. Ratchet arm 56 is biased inwardly towards the ratchet teeth 58 by means of a spring (not shown), and a spring-loaded pawl (not shown) may be provided for preventing wheel 59 and roller 36 from rotating backwards.

It will be seen that through the eccentrically journalled ratchet arm 56 and the planetary gear described above a rotation of shaft 54 causes a (stepwise) rotation of roller 36 and, hence, an advancing of tape 35 at a relatively low speed in relation to the speed of the vehicle.

A permanent magnet 63 which preferably is disc-shaped is secured to sleeve 55 and surrounded by an eddy-current ring 64 of electrically conductive but non-magnetizable material, which ring is secured to aforesaid crank arm 44, the pivot axis of which coincides with the axis of shaft 54. A stationary ring 65 of magnetizable material is mounted around ring 64. When shaft 54 and, hence, magnet 63 rotate a torque acting upon ring 64 is created in a known manner, and the magnitude of the torque is dependent upon the angular velocity of shaft 54 and thus the speed of the vehicle. The torque is equilibrated by an oppositely directed torque exerted by a spiral spring 66, see FIG. 6, which, when shaft 54 does not rotate, moves arm 44 and hence arm 43 and the extremity of light conductor 42 into the positions shown in FIG. 5.

Inside the housing, between bulb 41 and roller 37, a filter 67 is mounted which, for clarity, is shown only in FIG. 7 but which, transversely of the housing, extends at least across the entire width of tape 35. Filter 67 filters off light wavelengths which might produce a phosphorescence in the recording material on tape 35, that is to say that it will permit substantially only relatively long-waved light to pass and the illumination of the width of the tape provided via the filter causes any possibly remaining luminescence from points on tape 35 to cease before the tape passes from roller 37 across the active extremity of light conductor 42. It is ensured hereby that a curve previously recorded on the tape is always erased or deleted before any recording is again carried out at a specific point of the tape.

For photographing the recorded curve it may be desirable to manually move the tape a little backwards, that is to say against the normal advancing direction, and for this purpose a turning knob 58 is secured to the shaft of roller 36 which knob becomes accessible only after cover 28 is removed. The spring-loaded pawl referred to above which normally prevents a backwards rotation of roller 36, may then also be released manually.

For photographing the recorded speed curves, so-called Polaroid film which can be very rapidly developed may be employed with advantage, and, for instance, a film cassette of the type marketed under the trade name "Polaroid 4 × 5 Land Film Holder, Model 545" can be used. The exposure time may vary dependent upon the time that has elapsed since the curve was recorded, but in practice, if desired or in order to make quite certain, several pictures may be taken using different exposure times. By employing a Polaroid film with a 3,000 ASA rating and by recording the curve on phosphorescent material of the type mentioned above, it has been found in practice that exposure times of approximately 10 minutes are adequate when about 16 hours have passed since the curve was recorded.

With the above-described automatic erasure or deletion of the recorded curve by illuminating the entire width of the tape through a filter, it is possible to employ a tape of relatively short length and thus obtain an apparatus with modest space requirements which can easily be fitted in any automobile or motor cycle. For practical reasons, however, the length of the tape should not be shorter than corresponding to a distance of at least 5 km travelled by the vehicle since, in the case of a violation of a speed limit it is to be assumed that the motor vehicle may travel a distance of this length before a traffic patrol will be able to catch up with it.

In lieu of the mechanism for displacing one extremity of a fibre-optical light conductor transversely of a record tape as described above, it would also be possible to utilize a stationary optical system comprising a larger number of light conductors, the extremities of which are located juxtaposed in a line transverse to the tape. The opposite extremities of the light conductors would in this case be disposed along an arc of a circle adjacent a stationary light source, while a narrow aperture would be provided in a pivoting diaphragm located between the light source and the light conductors, the angular position of said diaphragm being dependent upon the speed of the vehicle. The narrow light beam passing from the light source through the diaphragm aperture would then, for a given speed of the vehicle, pass only through one or a few of the light conductors and at the opposite extremity of the light conductor or conductors in question the phosphorescent material on the tape would be excited and a continuous or quasi-continuous speed curve would be produced on the advancing tape in a manner similar to that described above.

The linkage described above and comprising arms 43, 44 and 45 produces a substantially rectilinear movement of the free extremity of light conductor 42 transverse to the longitudinal direction of the tape and, taken by and large, a proportionality between the displacement of the light conductor and the angular positon of eddy-current ring 64. However, this is not mandatory since, as already mentioned previously, it would always be possible to adapt the scales used for reading the photographed curve to the cinematic properties of the mechanism defining the position of the luminescent spot or point on the tape.

What I claim is:

1. Apparatus for continuously recording the speeds of a travelling vehicle comprising
    a light-proof housing,
    at least two rollers journalled for rotation on parallel axes within said housing and means for driving one of said rollers,
    an endless tape tracked over said rollers and in driving engagement with said driven roller, said tape having a uniformly distributed layer of phosphorescent material having an afterglow period of at least 2 hours,
    a light source and means for transmitting a light beam from said light source towards said tape,
    means connectable to the tachometer drive of a vehicle and connected to said light transmitting means in such a way that the point of intersection between said light beam and said tape — as measured in the transverse direction of said tape — is uniquely dependent upon the instantaneous speed of said vehicle,
    means within said housing for accommodating a photographic plate in engagement with at least a portion of said endless tape extending between said rollers, and
    a light trap for introducing said photographic plate into said housing and removing it there from.

2. Apparatus as claimed in claim 1, comprising means for automatically erasing a previous recording within any area of said tape before any subsequent recording is effected within said area by means of said light beam.

3. Apparatus as claimed in claim 2, wherein said light source is mounted adjacent said tape, and said erasing means comprises a filter interposed between said tape and said light source, which filter is adapted to filter off radiation the frequencies of which are capable of producing a phosphorescence of said phosphorescent material.

* * * * *